United States Patent
Furkert

[11] 3,906,039
[45] Sept. 16, 1975

[54] RECOVERY OF SULFUR DIOXIDE FROM SULFURIC ACID CONTAINING FERROUS SULFATE

[75] Inventor: Herbert Furkert, Grosskonigsdorf, Germany

[73] Assignee: Chemiebau Dr. A. Zieren GmbH & Co. KG, Mungersdorf, Germany

[22] Filed: Mar. 6, 1973

[21] Appl. No.: 338,416

[30] Foreign Application Priority Data
Mar. 6, 1972 Germany............................ 2210637

[52] U.S. Cl. ................ 423/540; 423/541; 423/633
[51] Int. Cl.² ........................................ C01B 17/50
[58] Field of Search .......... 423/530, 531, 539, 540, 423/541, 542, 138, 153, 154, 633

[56] References Cited
UNITED STATES PATENTS

| | | | |
|---|---|---|---|
| 1,048,247 | 12/1912 | Weeks | 423/540 X |
| 2,098,056 | 11/1937 | McBerty | 423/530 X |
| 2,155,119 | 4/1939 | Ebner | 423/604 |
| 2,202,414 | 5/1940 | Barnes et al. | 423/541 X |
| 2,280,508 | 4/1942 | Bousquet et al. | 423/530 |
| 2,936,215 | 5/1960 | Hochmuth | 423/207 |
| 3,047,362 | 7/1962 | Smith | 423/207 |
| 3,210,156 | 10/1965 | Zirngibl | 423/530 |
| 3,387,927 | 6/1968 | Goldberger | 423/531 |
| 3,439,724 | 4/1969 | Mason | 423/207 |
| 3,745,207 | 7/1973 | Hansen | 423/154 |
| 3,812,242 | 5/1974 | Barille et al. | 423/542 X |
| 3,825,657 | 7/1974 | Jennises | 423/540 |

FOREIGN PATENTS OR APPLICATIONS

| | | | |
|---|---|---|---|
| 1,347,884 | 2/1974 | United Kingdom | 423/539 |
| 2,037,619 | 7/1970 | Germany | 423/540 |

OTHER PUBLICATIONS

Olsen, J. C., Unit Processes and Principles of Chemical Engineering, D. UAW Nostrand Company Inc., 1932, N.Y., N.Y., pp. 1-3.

Alien Property Custodian Applic. No. 379872, to Ebner, K., Published Apr. 27, 1943.

*Primary Examiner*—Oscar R. Vertiz
*Assistant Examiner*—Gary P. Straub
*Attorney, Agent, or Firm*—Millen, Raptes & White

[57] ABSTRACT

In a process for the production of a gas containing sulfur dioxide from a dilute aqueous sulfuric acid stream containing iron (II) sulfate and approximately 10-40% by weight $H_2SO_4$, e.g. pickle liquor or waste $H_2SO_4$ from $TiO_2$ production, comprising concentrating the acid in an evaporation stage, and reductively cracking the concentrating acid in a cracking stage at temperatures of between 850° and 1,100° C. to a hot cracked gas containing $SO_2$ and metallic oxides, the improvement comprising evaporating the 10-40% strength sulfuric acid to 55-70% strength sulfuric acid by direct heat exchange with the hot cracked gas; simultaneously forming precipitate containing iron (II) sulfate; and passing resultant evaporated sulfuric acid to the cracking stage. The resultant cracked gas containing metallic oxides, aluminum and magnesium oxides in particular, is purified by the direct heat exchange treatment insofar as the metallic oxides are scrubbed out and become enmeshed in the sulfate precipitate.

7 Claims, 3 Drawing Figures

RECOVERY OF SULFUR DIOXIDE FROM SULFURIC ACID CONTAINING FERROUS SULFATE

BACKGROUND OF THE INVENTION

This invention relates to a process for the production of a gas containing sulfur dioxide from an aqueous sulfuric acid solution containing about 10–40 percent by weight $H_2SO_4$ and iron (II) sulfate, other metallic sulfates being also present in certain cases. The $SO_2$ is produced by evaporation and reductive dissociation, i.e. cracking, of the acid at temperatures of about between 850° and 1,100° C.

In several industrial chemical processes, there are obtained aqueous sulfuric acid byproduct streams containing metallic sulfates which must be disposed of in an ecologically acceptable manner. For example, in the production of titanium dioxide, an aqueous waste sulfuric acid stream is obtained which contains considerable amounts of $FeSO_4$ and minor proportions of $MgSO_4$, $TiOSO_4$, and other metallic sulfates. Likewise, when iron is pickled with sulfuric acid, a waste pickle liquor is produced containing, for example, 15 percent by weight of $H_2SO_4$ and 15 percent by weight of $FeSO_4$ and if the acid is to be reused as pickling acid, the $FeSO_4$ concentration must be reduced and the $H_2SO_4$ concentration thereof must be increased. To solve this problem, the prior art is crowded with many alternative suggestions, all of which have inherent limitations.

Thus, it has been known to concentrate pickle liquor by spraying same into a tower traversed by hot gases. The concentration step is conducted to the point where an addition of concentrated sulfuric acid results in a precipitate of iron (II) sulfate monohydrate, which is subsequently separated. In this process, though the iron sulfate content is lowered and the sulfuric acid content is raised, the acid can only be partially regenerated, for it is impossible to remove the iron completely. Accordingly, such partially regenerated acids must be frequently ion exchanged ("Stahl und Eisen" [Steel and Iron] 74 (1954), pp. 888 et seq.).

Another prior art process involves the roasting of an iron sulfate monohydrate suspension with a fuel and an oxygen-containing gas at temperatures of between 700° and 1,100° C. with the formation of $SO_2$. The suspension is formed by dissolving iron sulfate heptahydrate in water; however, only a portion of the iron (II) sulfate contained in the iron-containing waste sulfuric acids can be crystallized as the heptahydrate. Furthermore, the crystallization of the heptahydrate and the redissolution under formation of the monohydrate suspension are relatively expensive (British Pat. No. 1,017,661).

In still another process, it is possible to concentrate an aqueous sulfuric acid of 30–60 percent by weight of $H_2SO_4$, which can contain organic compounds and ammonium salts, by direct heat exchange with cracked gases having a temperature of 900°–1,100° C., to a more concentrated acid of 60–75 percent by weight $H_2SO_4$. The resultant concentrated acid is then cracked at temperatures of between 900° and 1,200° C. to $SO_2$-containing gases. This process was designed for waste sulfuric acids containing impurities which are decomposable into gaseous products during the cracking step. (DAS [German Published Application] No. 2,037,619).*) With respect to waste sulfuric acids containing iron (II) sulfate, however, very finely divided iron oxide would be formed during said cracking step.

*) corresponding to US Ser. No. 167 231

In still another prior art process, waste sulfuric acid stream from the production of titanium dioxide is concentrated by means of immersion heaters from a concentration of about 20% by weight to a concentration of about 65% by weight $H_2SO_4$, with iron sulfate and titanium sulfate being precipitated from the acid. After filtration of the sulfates, the acid is further evaporated to 93–95 percent by weight $H_2SO_4$ and subsequently separated from additionally precipitated sludge. Aside from the considerable heat requirements in the two evaporation stages, this process has the disadvantage that the highly concentrated sulfuric acid, despite two separation steps to remove the precipitated sulfates, still contains minor amounts of aluminum sulfate dispersed therein. This aluminum sulfate, in any case, settles at a very slow rate and interferes with the reuse of the acid for the ilmenite ore dressing process (U.S. Pat. No. 3,210,156). In order to make the aluminum sulfate readily filterable, a two-stage seasoning of the rough concentrate has been conducted between the preliminary concentration and the high concentration (DAS [German Published Application] No. 1,103,902). This combination of steps is inherently complex and relatively costly.

In a still further prior art process, waste sulfuric acid from titanium dioxide production is evaporated with immersion heaters, and the thus-evaporated acid in the form of a solution or suspension is cracked in a fluidized bed at 900°–1,100° C. The resultant metallic oxide impurities are then separated from the gaseous stream. Such a process conducted with preliminary evaporation by immersion heaters has a high specific energy consumption and is relatively costly (Belgian Pat. No. 633,219).

SUMMARY OF THE INVENTION

It is an object of the present invention to provide an improved process wherein at least part of the sulfate sulfur in waste sulfuric acids containing iron (II) sulfate and optionally other metallic sulfates is recovered in the form of $SO_2$-containing gas.

A particular object is to provide a process which can produce sulfur dioxide of such purity that it can be converted by the contact process into sulfuric acid free of metallic sulfates, particularly aluminum sulfate, and which can be reused for the dressing of titanium ore.

A still further object is to obtain the concentrated sulfuric acid from the dilute waste acid with a minimum amount of energy.

Upon further study of the specification and appended claims, further objects and advantages of this invention will become apparent to those skilled in the art.

To attain these objects, 10–40 percent by weight sulfuric acid containing ferrous sulfate is evaporated by direct heat exchange with the hot cracked gas to 55–70 percent by weight sulfuric acid, while iron (II) sulfate and in certain cases other metallic sulfates are precipitated out. The thus-concentrated sulfuric acid is then subjected to the cracking step. The utilization of the hot cracked gas for the evaporation of the dilute acid and for the formation of the precipitate containing iron (II) sulfate eliminates the need for immersion heaters heretofore required for the preliminary concentration.

Furthermore, there is no need for either steam or vacuum in this step.

During the evaporation step, water from the dilute acid evaporates into the cracked gas, whereby the cracked gas is cooled from about 900°–1,100° C. to about 100°–250° C. By further cooling of the cracked gas, which leaves the evaporation stage at the latter temperature range, the water can be condensed out. The evaporation is conducted to a concentration of 55–70 percent, preferably 60–65 percent by weight of $H_2SO_4$. At a higher degree of evaporation, the concentrated acid becomes difficult to handle, due to the precipitated metallic sulfates (aluminum sulfate).

In accordance with one embodiment, the concentrated sulfuric acid is cracked with the suspended precipitate, and the metallic oxides formed during the cracking step are separated from the hot cracked gas prior to its use for evaporation purposes. In this manner of operation, a substantially sulfate-free metallic oxide mixture is obtained from the cracked gas stream. The separation is suitably effected by one or more cyclones wherein the separation takes place at temperatures of about 700°–900° C. After being passed through the cyclones, the cracked gas, essentially free of finely divided metallic oxides, is passed to the evaporation stage wherein residual metallic oxides are scrubbed out of the cracked gas simultaneously with the evaporation process.

In accordance with the preferred embodiment of this invention, the concentrated sulfuric acid is separated from the precipitate produced during the evaporation step, and is then cracked. The precipitate generally comprises a mixture of metallic sulfates and metallic oxides, the sulfates being directly separated from the acid, and the oxides forming part of the precipitate by being scrubbed out from the cracked gas stream. Since, in a 55–70 percent by weight sulfuric acid, only aluminum sulfate and magnesium sulfate remain essentially soluble, the proportion of the precipitate derived from the cracked gas stream comprises mainly of the oxides of these two metals.

When processing a dilute acid obtained during the manufacture of titanium dioxide, a precipitate is separated after the evaporation, consisting essentially of iron sulfate, iron oxide, titanium oxysulfate, titanium oxy-oxide, aluminum sulfate, aluminum oxide, magnesium sulfate, and magnesium oxide. Aluminum oxide, as well as magnesium oxide, do not reenter the solution after being scrubbed out from the cracked gas stream. In contrast to the difficulty separable aluminum sulfate hydrates produced during the conventional high concentration step of the acid with immersion heaters, the aluminum and magnesium oxides of this invention can be separated relatively easily by filtration or centrifugation. Moreover, these oxides facilitate the separation of the other metallic sulfate hydrates from the solution which takes place during the evaporation step, whereby super-saturations of the relatively insoluble sulfates are reduced, and the resultant rough-concentrated sulfuric acid separated from the precipitate, enters the cracking stage with a minimum content of metallic sulfates.

Preferably, for cracking purposes, the concentrated sulfuric acid is introduced into a reactor through nozzles, and the reactor is traversed by a turbulent stream of combustion gas. This reactor, known as a turbulator, comprises an approximately pear-shaped bricklined reaction chamber into which the hot combustion gases are fed at the bottom under strong swirling. Between an outer, spirally upwardly directed main current and an axial backflow oriented spirally downwardly, areas of high turbulence are formed, which turbulence effects a thorough intermixing of the dilute acid, introduced through nozzles at the ceiling, with the hot combustion gas. The thus-produced cracked gas is discharged tangentially from the reaction chamber at the head of the reactor. The heating and reaction of the rough-concentrated acid introduced through nozzles requires a residence time in this reaction chamber of merely between 0.05 and 2, preferably 0.1–1.0 seconds. The oxygen content at the outlet of the reaction chamber is, in this type of reactor, as also in case of other cracking furnaces, between 0.5 and 10 percent by volume, preferably between 1 and 5 percent by volume of oxygen.

In accordance with the preferred embodiment of the process of this invention, the precipitate separated from the roughconcentrated acid is cracked separately from the evaporated sulfuric acid at temperatures of between 850° and 1,100° C., and the solids are separated from the thus-formed cracked gas. In particular with small cracking furnaces operating at high gas turbulence, it is advantageous to employ several units, wherein somewhat differing reaction conditions are selected which are adapted to the cracking of the acid and/or of the sulfate-containing precipitate.

Preferably, an additional provision is made that the 10–40 percent strength sulfuric acid is concentrated and cracked in a series of n stages, each consisting essentially of a cracking unit, an evaporation unit, and a separation unit. The precipitate is separated from the concentrated acid in each stage; the thus-separated acid is fed to the evaporation unit and the precipitate to the cracking unit of the subsequent stage; the dilute acid is fed to the evaporation unit and the acid concentrated in the $n$-th stage is fed to the cracking unit of the first stage; and the precipitate separated after the $n$-th stage is removed from the process, wherein n can represent an integer from 1 to 4, preferably 2 or 3. In the series connection of n stages of this type, the sulfuric acid is concentrated in a stepwise manner, for example, in a series of 3 stages, from 25 percent by weight to 40 percent by weight $H_2SO_4$ in the first stage; from 40 to 55 percent by weight $H_2SO_4$ in the second stage; and from 55 to 63 percent by weight $H_2SO_4$ in the third stage. The cracked gas streams from the concentration units are suitably combined and cooled together for the purpose of condensing the water and further processed in a conventional manner to sulfuric acid. The precipitate of the n-th stage consists predominantly of metallic oxides and only of a minor proportion of iron sulfate monohydrate; whereas in contrast thereto, in the first stages, iron sulfate monohydrate is the predominant substance in the precipitate. The units of each stage are, preferably, a turbulator, an open tower for the evaporation step, and a decanting vessel. Since the precipitate of one stage is cracked in the subsequent stage, it is unnecessary to separate the precipitate in an acid-free manner. It is sufficient to discharge the precipitate as a thick slurry from the decanting vessel and further crack this product in the next stage.

In a particularly preferred embodiment of this invention, the dilute sulfuric acid is evaporated, in a first stage, to 40–55 percent by weight $H_2SO_4$ and, in a second stage, to 55–70 percent by weight $H_2SO_4$. In the cracking unit of the first stage, a portion of the acid concentrated in the second stage and optionally a portion of the acid concentrated in the first stage are subjected to the cracking step; and, in the cracking unit of the second stage, the precipitate of the first stage and optionally the remaining portion of the acid concentrated in the second stage are subjected to the cracking process. In this two-stage mode of operation, an acid free of precipitate is cracked in the cracking unit of the first stage, and a precipitate consisting predominantly of sulfate is separated in the separating unit of the first stage, the latter precipitate being cracked in the cracking unit of the second stage, together with rough-concentrated acid.

According to another embodiment of the invention, the 10–40 percent strength sulfuric acid is fed to the evaporation units of a series of stages, each consisting essentially of a cracking unit, an evaporation unit, and a separation unit. The concentrated sulfuric acid is separated from the precipitate in each stage; the separated sulfuric acid of all stages is cracked in at least one cracking unit; the precipitates of all stages are cracked in at least one other cracking unit; and the residue of the stage wherein the precipitates are cracked is at least partially withdrawn from the process. In a two-stage process according to this mode of operation, the dilute acid is fed to both evaporating stages. In the cracking unit of the first stage, only acid is cracked and in the cracking unit of the second stage, only thickened precipitate is cracked.

The process of this invention is particularly applicable to the treatment of waste streams from iron pickling and titanium dioxide producing plants. These waste streams, as well as other waste streams beneficially treated by this invention have the following analyses.

| Component | General % by weight |
|---|---|
| $H_2SO_4$ | 10–40 |
| $Fe(II)SO_4$ | 5–25 |
| other metal sulfates | 0–9 |
| $H_2O$ | 50–75 |

| Component | Pickle Liquor % by weight |
|---|---|
| $H_2SO_4$ | 10–40 |
| $Fe(II)SO_4$ | 10–25 |
| $H_2O$ | 50–80 |

| Component | $TiO_2$ Plant % by weight |
|---|---|
| $H_2SO_4$ | 10–40 |
| $Fe(II)SO_4$ | 5–10 |
| $MgSO_4$ | 1,5–3,0 |
| $(Al)_2(SO_4)_3$ | 0,3–3,0 |
| $TiOSO_4$ | 0,8–2,5 |
| $H_2O$ | 60–70 |

Cracking of the waste sulfuric acid according to DAS No. 2,037,619 yields only gaseous products whereas the acids of the present process produce fine metal oxides suspended in the hot cracked gas. These fine metal oxides prevent a skilled man without knowledge of our invention to use the process of said DAS with waste acids containing dissolved metal sulfates as said oxides are concentrated in the acid of the evaporation stage and are recycled to the cracking stage whereby acid spraying is impaired and oxide content of the cracked gas is more and more increased so that part of the oxides pass through the evaporation stage into the subsequent contact plant.

DETAILED DESCRIPTION OF THE DRAWINGS

Figure 1:
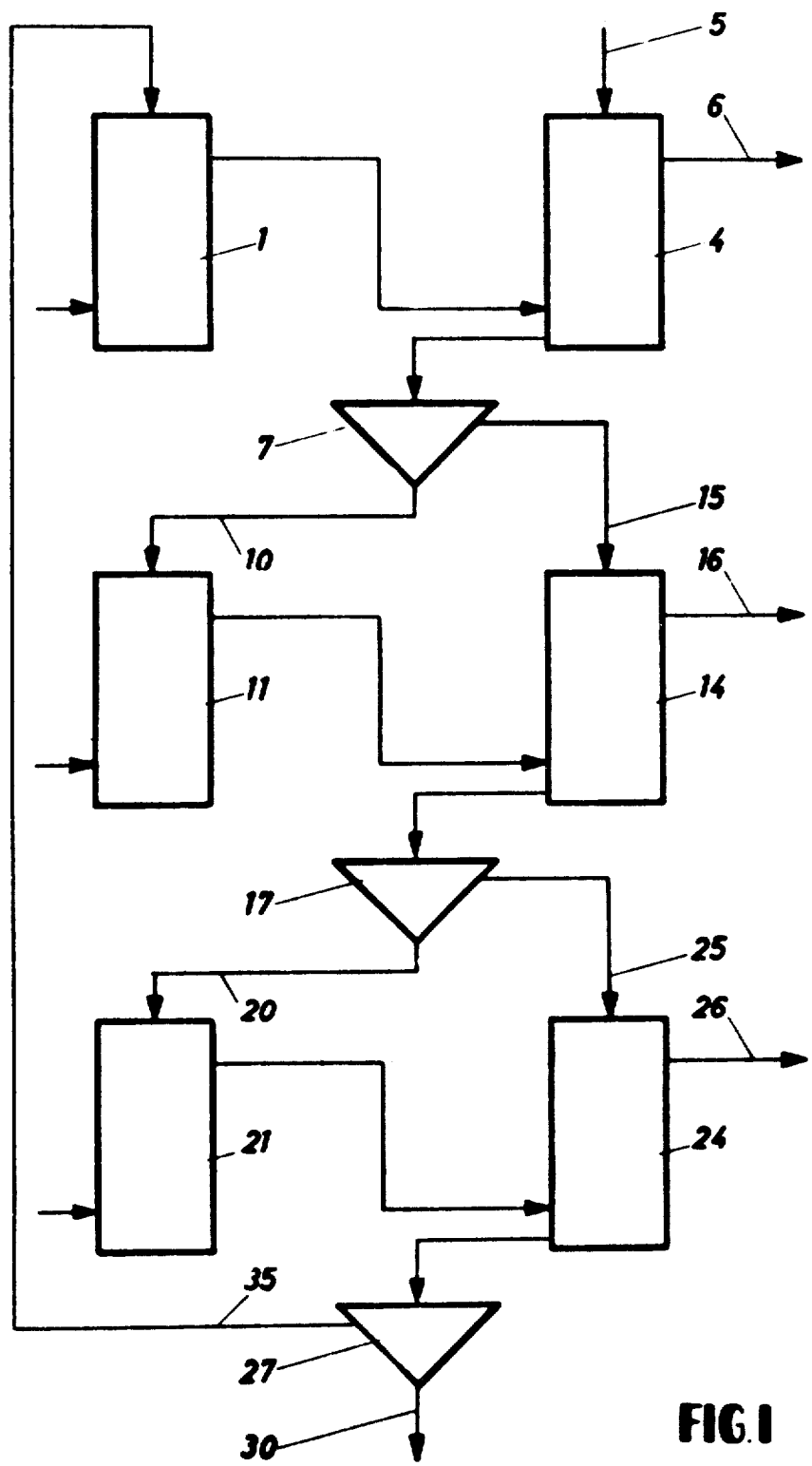
FIG. 1 is a schematic flow sheet of a cracking plant consisting of three stages with series-connected evaporating units.

In the three-stage evaporating system shown in FIG. 1, the dilute sulfuric acid to be cracked is fed to the open tower 4 of the first stage via conduit 5. This first stage is comprised of the cracking furnace 1, the open tower 4, and the decanting vessel 7. An approximately 63 percent strength sulfuric acid is withdrawn from the last stage via conduit 35, and then sprayed into the cracking furnace 1 where it is cracked at about 1,000° C. The cracking temperature is produced by the combustion of fuel oil. The cracked gas is passed to tower 4 and countercurrently contacted against the dilute acid containing about 20 percent by weight $H_2SO_4$ and metallic sulfates. The acid is concentrated to 40 percent by weight $H_2SO_4$ during this step, separated in the decanting vessel 7 from the precipitate, and fed via conduit 15 into the evaporating tower 14 of the second stage, wherein it is concentrated to about 55 percent by weight $H_2SO_4$.

The slurry separated in the decanting vessel 7 is introduced via conduit 10 into the cracking furnace 11 of the second stage, through nozzles, and cracked therein. The cracked gas serves for heating the evaporation tower 14 of this stage. After separating the acid from tower 14 from the newly formed precipitate in the decanting vessel 17, the acid passes through conduit 25 into the evaporating tower 24 of the third stage and is concentrated therein to approximately 63 percent by weight $H_2SO_4$. The sulfate slurry separated in the decanting vessel 17 is introduced via 20 through nozzles into the cracking furnace 21, the cracked gas of which serves for heating the evaporation tower 24. The solution evaporated in tower 24 is separated in the decanting vessel or filter 27 into sulfuric acid and solid matter. The solid matter is discharged at 30, while the approximately 63 percent by weight sulfuric acid is fed via conduit 35 to the cracking furnace 1 of the first stage. The $SO_2$-containing cracked gases are withdrawn from the evaporation towers of the three stages at 6, 16, and 26, combined, and after a further cooling to 40°–60° C. to condense the water contained therein, are processed for sulfuric acid.

Figure 2:
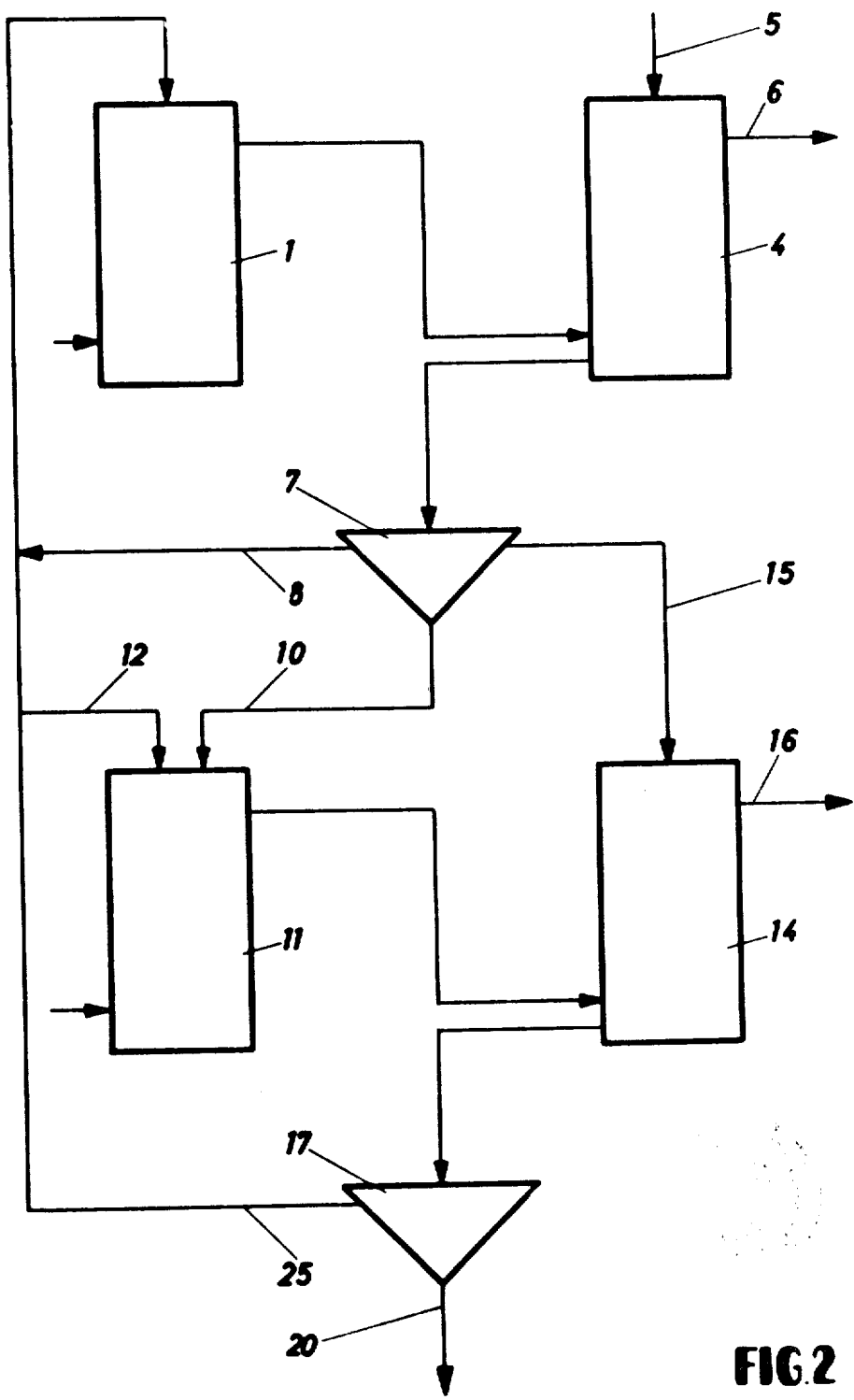
FIG. 2 is a schematic flow sheet of a plant consisting of two stages with series-connected evaporating units.
Figure 3:
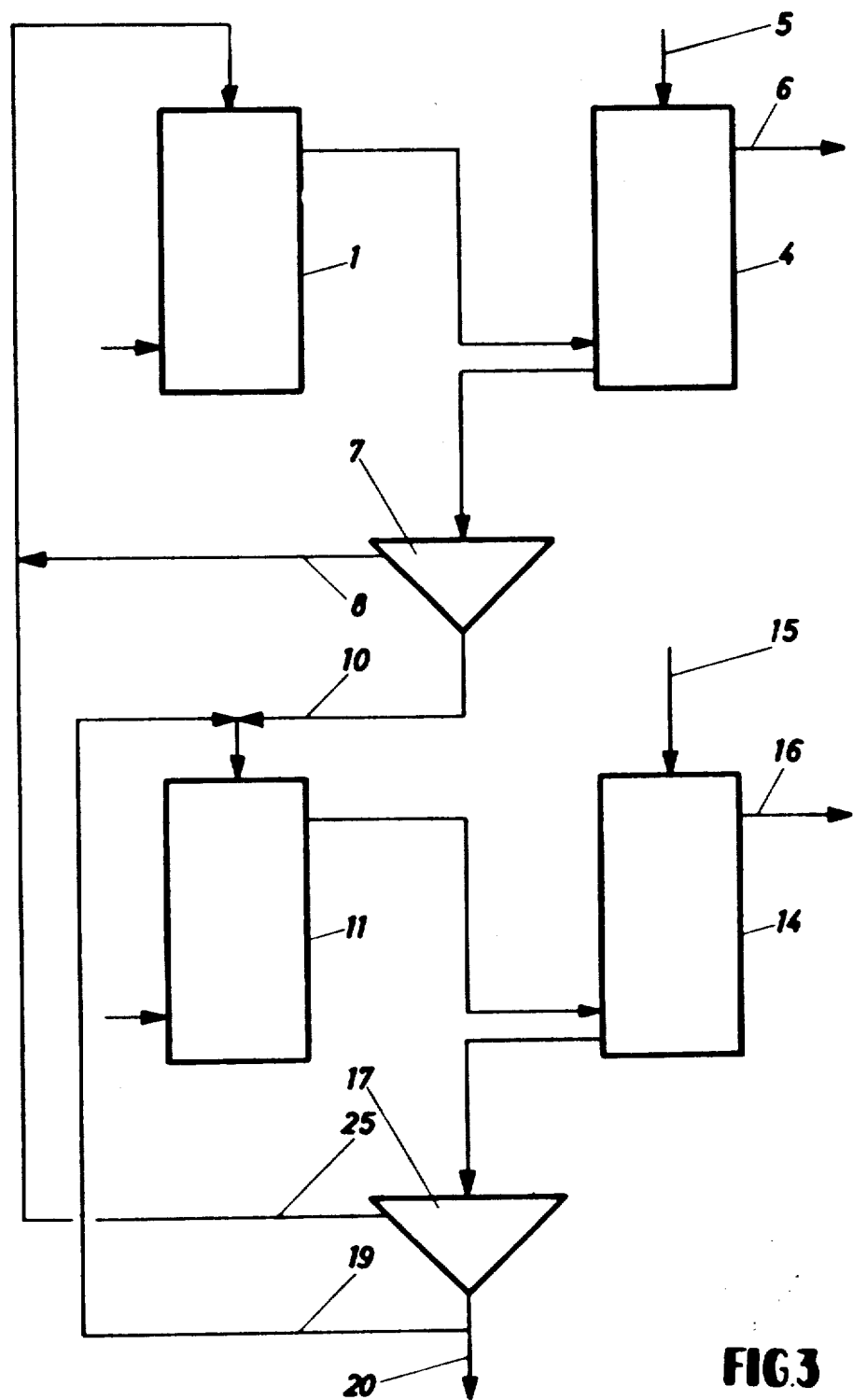
FIG. 3 is a schematic flow sheet of a cracking plant with parallel-fed evaporating units.

FIG. 2 shows a two-stage plant for the cracking of waste sulfuric acid, wherein dilute acid of 20 percent by weight $H_2SO_4$ is fed via 5 into the open tower 4. The evaporation in the tower 4 of the sulfuric acid is conducted with the aid of the hot cracked gases from the cracking furnace 1. The acid, evaporated in tower 4 to about 50 percent by weight $H_2SO_4$, is separated in the decanting vessel 7 from the precipitated metallic sulfates and fed, in part, through conduit 15 to the evaporation tower 14 of the second stage and, in part, through conduit 8 to the cracking furnace 1 of the first stage. The sludge withdrawn from the decanting vessel 7 is introduced into the furnace 11 via conduit 10, together with a part of the concentrated acid from the second stage conveyed via conduit 12, and both streams are cracked in said furnace. The $SO_2$-containing gas withdrawn from the furnace 11 serves for evaporation purposes in tower 14 and is discharged from the plant via conduit 16. The acid concentrated in the tower 14 is separated, in the decanting vessel 17, into: (a) a residue consisting essentially of a large amount of metallic oxide and a small amount of metallic sulfate, and (b) an approximately 63 percent strength acid. The acid is fed, in part, via conduit 25 to the cracking furnace 1 of the first stage and, in part, via conduit 12 to the cracking furnace 11 of the second stage. The cracked gas streams 6, 16 withdrawn from the evaporators 4, 14 are processed in the conventional manner to concentrated sulfuric acid by the contact vessels FIG. 3 shows a plant wherein two units comprised of cracking furnaces 1 and 11, evaporating towers 4 and 14, and decanting vessels 7 and 17, respectively, are connected in parallel. The dilute acid is introduced via nozzles into the evaporating towers 4, 14 via conduits 5, 15. The towers 4, 14 are charged with the hot cracked gases from the cracking furnaces 1 and 11, respectively. The suspension discharged from the evaporating towers 4 and 14 is separated in the decanting vessels 7 and 17, respectively, into solid matter and sulfuric acid. The solid matter obtained in 7, comprised predominantly of sulfate, conveyed by conduit 10, is cracked in the furnace 11 together with a portion of the precipitate comprised predominantly of oxide, which was separated in the decanting vessel 17 and fed via conduit 19. The cracked gas from 11 serves for evaporating the dilute acid in tower 14. The remainder of the solid matter separated in the decanting vessel 17 is discharged at 20. The overflows of both vessels 7, 17 are fed to the furnace 1 via conduits 25, 8 and cracked in this furnace. The gases withdrawn at 6, 16 are combined, cooled, and further processed in the usual manner for sulfuric acid by means of the contact process.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 4915 kg./h/ of waste sulfuric acid from a titanium dioxide plant are processed, of the following composition:

| | |
|---|---|
| 20.35% by weight | $H_2SO_4$ |
| 0.76% by weight | $TiOSO_4$ |
| 12.3% by weight | $FeSO_4$ |
| 0.48% by weight | $Al_2(SO_4)_3$ |
| 0.21% by weight | $MnSO_4$ |
| 0.1% by weight | $CaSO_4$ |
| 2.77% by weight | $MgSO_4$ |
| less than 0.15% by weight | other sulfates |
| remainder: | water |

This waste sulfuric acid is evaporated by 4588 $Nm^3/h$. of cracked gas having a temperature of approximately 1,100° C. The resultant cooled cracked gas leaves the evaporation stage in an amount of 7,868 $Nm^3/h$. at a temperature of 165° C. and has the following composition:

| | |
|---|---|
| 2.94% by volume | $SO_2$ |
| 1.92% by volume | $O_2$ |
| 5.28% by volume | $CO_2$ |
| 30.69% by volume | $N_2$ and |
| 59.17% by volume | $H_2O$ |

The concentrated waste acid is separated from the solids contained therein in a centrifuge, thus producing 836 kg. of a solids mixture comprising about 97 percent by weight of metallic sulfate, the remainder being metallic oxide.

After separation of the precipitate, there remains 1,587 kg./h. of rough-concentrated acid with 63.0 percent by weight $H_2SO_4$, 3.5 percent by weight $MeSO_4$, and 33.5 percent by weight $H_2O$. This acid is cracked in a cracking furnace provided with 266 kg./h. of fuel oil and 3,045 $Nm^3/h$. of air preheated to 500° C. The gas discharged from the cracking furnace contains 5.0 percent by volume $SO_2$; 3.3 percent by volume $O_2$; 29.0 percent by volume $CO_2$; 52.6 percent by volume $N_2$; 30.0 percent by volume $H_2O$; and 26 kg./h. of metallic oxide, the latter being absorbed by the acid in the evaporation tower. The gas leaving the evaporation tower, after cooling and water removal, has an $SO_2$-content of about 7.1 percent and is suitable for being further converted to concentrated sulfuric acid in accordance with the contact process.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of a sulfur-dioxide-containing gas for the contact process from a dilute aqueous sulfuric acid stream containing iron (II) sulfate and approximately 10–40 percent by weight $H_2SO_4$, comprising concentrating the acid in an evaporation stage, and reductively cracking the concentrated acid in a cracking stage at temperatures of between 850° and 1,100° C. to a hot cracked gas containing $SO_2$ said concentrated acid being sprayed through nozzles into a reactor for said reductive cracking, said reactor being traversed by a turbulent stream of combustion gas, the improvement comprising evaporating the 10–40 percent strength sulfuric acid to 55–70 percent strength sulfuric acid by direct heat exchange with the hot cracked gas; simultaneously forming precipitate containing iron (II) sulfate separating the precipitate from resultant concentrated acid, cracking said precipitate at 850°–1,100° C in a zone separate from where the resultant concentrated sulfuric acid is cracked, separating a portion of metallic oxides formed during the cracking of said precipitate to hot cracked gas, employing resultant hot cracked gas for evaporation purposes; and passing the resultant concentrated sulfuric acid to the cracking stage and employing resultant hot cracked gas also for evaporation purposes.

2. A process according to claim 1, wherein the dilute acid is derived from a process for the production of titanium dioxide, said precipitate consisting essentially of iron (II) sulfate, iron oxide, titanium oxysulfate, titanium oxy-oxide, aluminum sulfate, aluminum oxide, magnesium sulfate, and magnesium oxide.

3. A process according to claim 1 wherein said dilute aqueous sulfuric acid stream contains 5–25 percent by weight of iron (II) sulfate.

4. A process according to claim 1 wherein said dilute aqueous sulfuric acid stream is a pickle liquor containing 10–25 percent by weight of iron (II) sulfate.

5. In a process for the production of a sulfurdioxide-containing gas for the contact process from a dilute aqueous sulfuric acid stream containing iron (II) sulfate and approximately 10–40 percent by weight $H_2SO_4$, comprising concentrating the acid in an evaporation stage, and reductively cracking the concentrated acid in a cracking stage at temperatures of between 850° and 1,100° C. to a hot cracked gas containing $SO_2$, said concentrated acid being sprayed through nozzles into a reactor for said reductive cracking, said reactor being traversed by a turbulent stream of combustion gas, the improvement comprising evaporating the 10–40 percent strength sulfuric acid to a more concentrated strength sulfuric acid by direct heat exchange with the hot cracked gas; simultaneously forming precipitate containing iron (II) sulfate separating the precipitate from resultant concentrated acid, cracking said precipitate at 850°–1,100° C. in a zone separate from where the resultant concentrated sulfuric acid is cracked, separating a portion of metallic oxides formed during the cracking of said precipitate to hot cracked gas, employing resultant hot cracked gas for evaporation purposes; and passing the resultant concentrated sulfuric acid to the cracking stage and employing resultant hot cracked gas also for evaporation purposes; and wherein the 10–40 percent strength sulfuric acid is evaporated and cracked in a series of $n$ stages, each stage consisting essentially of a cracking unit, an evaporation unit, and a separating unit; and in each stage, the precipitate is separated from the concentrated acid; the separated acid is fed to the evaporation unit and the precipitate is fed to the cracking unit of the subsequent stage; the dilute acid of the evaporation unit and the acid concentrated in the $n$-th stage are fed to the cracking unit of the first stage; and the precipitate separated after the $n$-th stage is removed from the process; and wherein $n$ represents an integer from 2 to 4.

6. A process according to claim 5, wherein the dilute sulfuric acid is evaporated, in a first stage, to 40–55 percent by weight $H_2SO_4$ and, in a second stage, to 55–70 percent by weight $H_2SO_4$; in the cracking unit of the first stage, at least a portion of the acid concentrated in the second stage and a portion of the acid concentrated in the first stage, are cracked; and in the cracking unit of the second stage, the precipitate from the first stage and the remainder of the acid concentrated in the second stage are cracked.

7. In a process for the production of a sulfur-dioxide-containing gas for the contact process from a dilute aqueous sulfuric acid stream containing iron (II) sulfate and approximately 10–40 percent by weight $H_2SO_4$, comprising concentrating the acid in an evaporation stage, and reductively cracking the concentrated acid in a cracking stage at temperatures of between 850° and 1,100° C. to a hot cracked gas containing $SO_2$, said concentrated acid being sprayed through nozzles into a reactor for said reductive cracking, said reactor being traversed by a turbulent stream of combustion gas, the improvement comprising evaporating the 10–40 percent strength sulfuric acid to a more concentrated strength sulfuric acid by direct heat exchange with the hot cracked gas; simultaneously forming precipitate containing iron (II) sulfate separating the precipitate from resultant concentrated acid, cracking said precipitate at 850°–1,100° C. in a zone separate from where the resultant concentrated sulfuric acid is cracked, separating a portion of metallic oxides formed during the cracking of said precipitate to hot cracked gas, employing resultant hot cracked gas for evaporation purposes; and passing the resultant concentrated sulfuric acid to the cracking stage and employing resultant hot cracked gas also for evaporation pruposes; wherein the 10–40 percent strength sulfuric acid is fed to evaporation units of a series of stages, each stage consisting essentially of a cracking unit, an evaporation unit, and a separation unit; the concentrated sulfuric acid is separated from the precipitate in each stage; the separated sulfuric acid of all stages is cracked in at least one cracking unit; the precipitates of all stages are cracked in at least one other and separate cracking unit; and the residue of the stage wherein the precipitates are cracked is at least partially removed from the process.

* * * * *